Dec. 4, 1951            B. EISENBERG            2,577,570
APPARATUS AND METHOD FOR ELECTRICALLY SPLICING FILM
Filed Aug. 6, 1947                          4 Sheets-Sheet 1
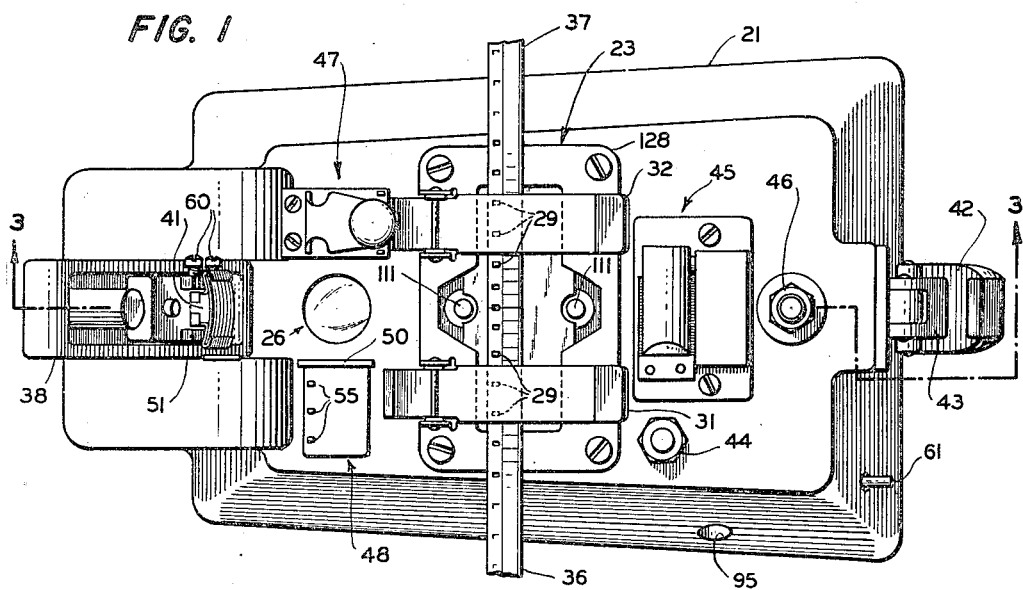
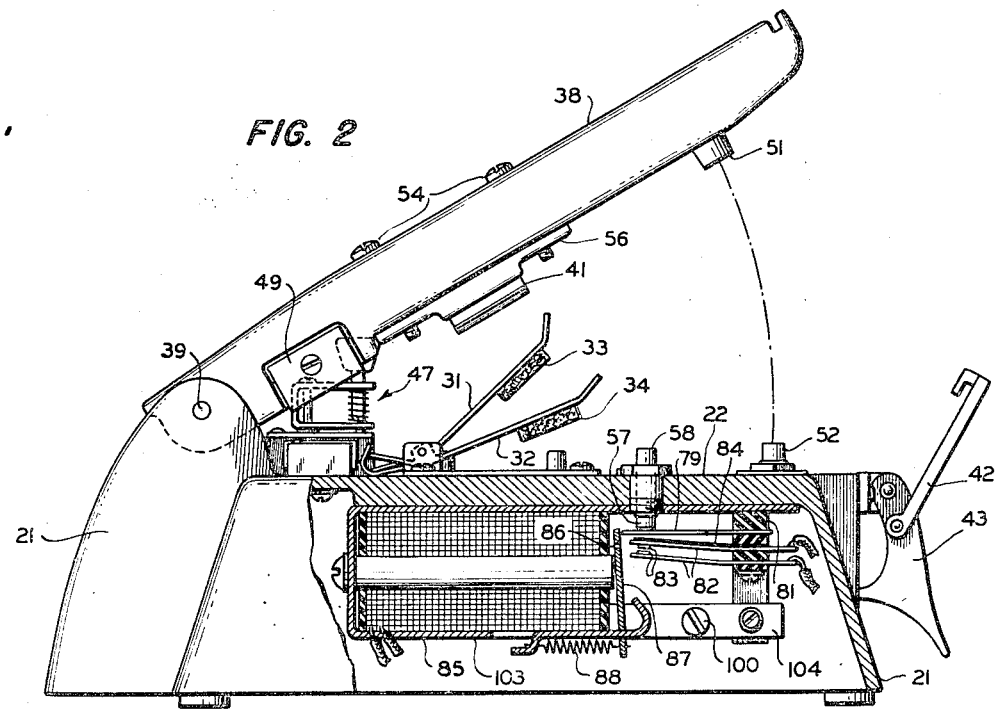
INVENTOR
BEN EISENBERG
BY Morris Relson
ATTORNEY INVENTOR
BEN EISENBERG
BY Morris Relson
ATTORNEY Dec. 4, 1951  B. EISENBERG  2,577,570
APPARATUS AND METHOD FOR ELECTRICALLY SPLICING FILM
Filed Aug. 6, 1947  4 Sheets-Sheet 3
FIG. 5
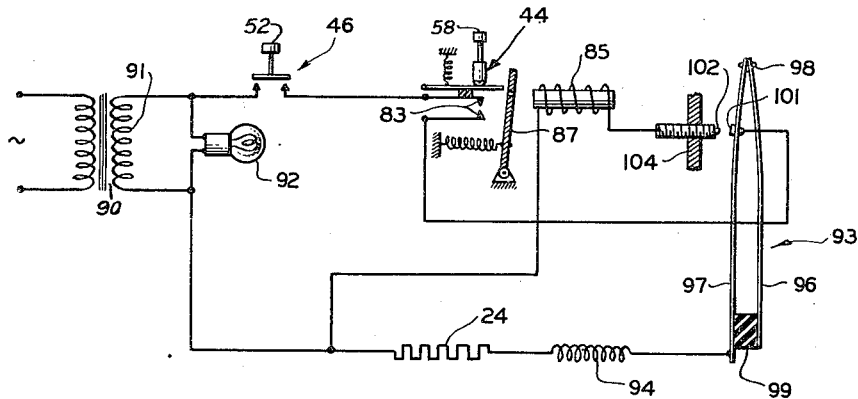
FIG. 12
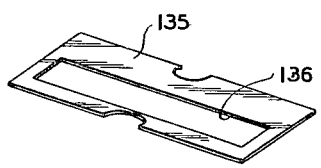
FIG. 18
FIG. 19
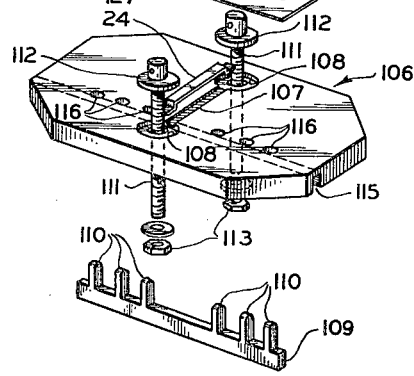
FIG. 6
INVENTOR
BEN EISENBERG
BY
Morris Relson
ATTORNEY Dec. 4, 1951  B. EISENBERG  2,577,570
APPARATUS AND METHOD FOR ELECTRICALLY SPLICING FILM
Filed Aug. 6, 1947  4 Sheets-Sheet 4
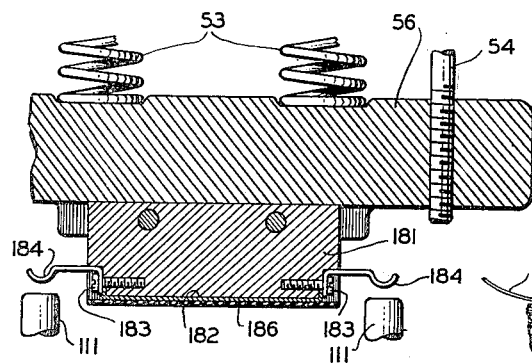
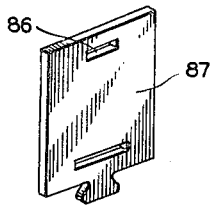
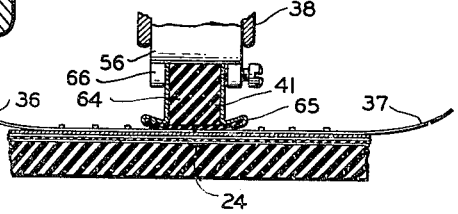
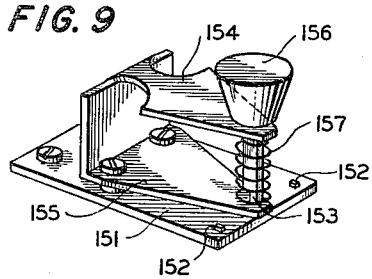
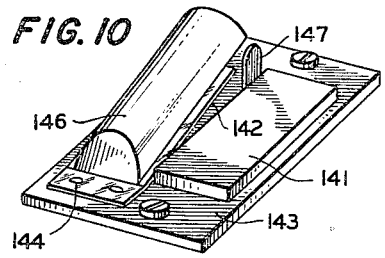
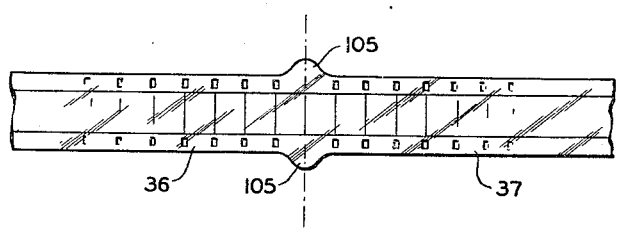
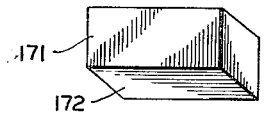
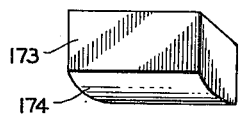
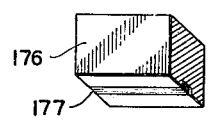
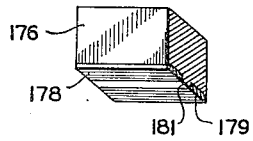
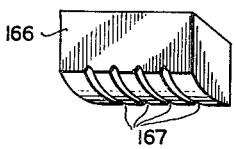
INVENTOR
BEN EISENBERG
BY Morris Relson
ATTORNEY Patented Dec. 4, 1951

2,577,570

UNITED STATES PATENT OFFICE 2,577,570

APPARATUS AND METHOD FOR ELECTRICALLY SPLICING FILM

Ben Eisenberg, Larchmont, N. Y.

Application August 6, 1947, Serial No. 766,843

19 Claims. (Cl. 154—42.1)

The present invention relates to the art concerning apparatus and methods for joining or splicing sections of thermoplastic films or sheets, and is especially adapted to join sections of photographic still or motion picture film or microfilm, bearing a photographic emulsion, although not limited to such types of film.

In joining sections of film of this type, it has become customary to scrape the emulsion from one of the film sections to be joined, then coat the scraped portion with an adhesive or cement, overlap the coated portion with the other section, and then hold the lapped portions tightly under pressure while the cement or adhesive sets or dries. Such methods of joining film are awkward and tedious, requiring many separate operations. The use of cement or adhesive causes considerable annoyance, especially where film splices or joints are only intermittently made, since the cement or adhesive has a tendency to alter its consistency by evaporation and to lose its desirable adhesive characteristics. For these reasons splices made in this manner have lacked uniformity and have not been consistently acceptable. Furthermore, the splice formed in this manner has a section of double thickness where the ends of the joined film sections overlap.

Most of the disadvantages of such prior methods of forming film splices are overcome by the present apparatus and method, by which the necessity for using a cement or adhesive is completely dispensed with, and a uniformly excellent splice is formed with no overlap whatever, so that the film remains of the same thickness throughout, including the spliced section.

In the present method, the cut ends of the film sections to be spliced are placed in abutting relationship with their junction line located over a narrow heating element, such as an electrically heated resistance wire or strip. By the application of pressure over the junction line and the provision of a temperature gradient having maximum temperature at the junction line and gradually decreasing on either side of said line, the pressure and heat being applied for a predetermined time interval, a splice is formed which can only with difficulty be detected from, and which is nearly as strong and flex-resistant as, the unspliced film. No scraping of emulsion or cement or adhesive are required, and no overlap is produced.

The present invention is particularly concerned with providing novel apparatus and methods for producing such improved splices. Accordingly, it is an object of the present invention to provide an improved method and means for joining films or sheets of the above type in a minimum length of time and with the utmost convenience, to produce a splice which is smooth and pliable and substantially as strong as the material bonded thereby.

Another object of the invention is to provide an improved method and means for insuring the proper efficient distribution of heat and the proper temperature gradient along the adjoining edges of a thermoplastic weld or splice of the butt type.

A further object of the present invention is to provide improved apparatus and methods for assuring maximum strength of the splice of the above-described type.

Another object of the present invention is to provide improved apparatus and methods for welding photographic film sections without emulsion distortion.

Still another object of the present invention is to provide improved apparatus for determining the duration of the application of heat in a welded splice for thermoplastic materials, which apparatus is automatically self-stabilizing with respect to voltage and ambient temperature changes.

Other objects and advantages of the present invention will become apparent from the following specification, taken in conjunction with the appended drawings, wherein:

Fig. 1 is a plan view of a splicing apparatus according to the present invention, with the pressure arm in fully raised position;

Fig. 2 is a side elevation view of the apparatus of Fig. 1, with a portion of the base cut away to show the interior thereof and with the pressure arm in partially raised position;

Fig. 5 is a schematic and circuit diagram of the excitation and control circuit for the heater element;

Fig. 6 is an exploded perspective view of the heater assembly;

Fig. 7 is a fragmentary transverse cross-sectional view showing two abutting film ends engaged between the pressure block and the heater assembly;

Fig. 8 is a perspective view of the relay armature of Figs. 2 and 4;

Fig. 9 is a fragmentary perspective view of the sprocket hole punch of the device of the preceding figures;

Fig. 10 is a fragmentary perspective view of the trimming device of the apparatus of the preceding figures;

Fig. 11 is a plan view of a completed splice before trimming;

Fig. 12 is a perspective view of a modified gradient plate;

Figs. 13 and 14 are perspective views of modified pressure blocks;

Figs. 15 and 16 are perspective cross-sectional views of other modified pressure blocks;

Fig. 17 is a perspective view of another form of pressure block;

Figs. 18 and 19 are perspective views of masking plates optionally useful with the apparatus of the preceding figures; and Fig. 20 is a perspective cross-sectional view of a further modification of a pressure block incorporating a heater element.

Figure 3:
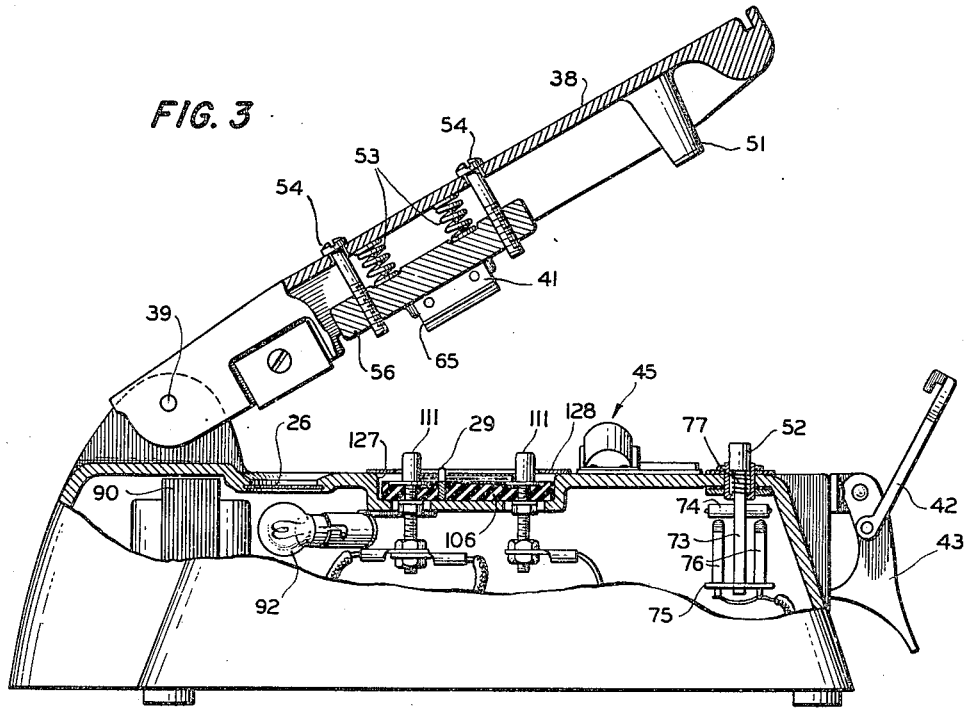
Fig. 3 is a partial elevation sectional view taken along line 3—3 of Fig. 1.

The invention is herein illustratively described in the form of apparatus for joining strips of photographic film such as motion picture film or microfilm, or the like, having an emulsion coating upon an acetate or other thermoplastic base, although it will be evident as the description progresses that the method and apparatus herein disclosed are equally applicable to the splicing or joining of other types and shapes of thermoplastic film-like materials.

Referring now to Figures 1 through 10, there is illustrated a preferred practical commercial embodiment of the present invention which consists of a hollow base 21, generally in the form of a truncated open-bottomed, four-sided pyramid having a top surface 22 forming a working surface for the apparatus. Approximately in the center of the working surface 22 is a heater assembly 23 which contains a heater element 24 providing the welding or bonding heat. It also contains a series of locating pins 29 adapted to engage the sprocket holes of the film sections 36, 37 to be joined. This heater assembly 23 is shown more in detail in Fig. 6 and will be described below.

A pair of film-holding arms 31, 32 having respective felt or rubber friction pads 33, 34 on the under surfaces thereof are pivotally mounted upon the heater assembly 23, so as to resiliently maintain the film ends 36, 37 against accidental movement during the splicing operation.

A pressure arm 38 is pivotally mounted upon the base as at 39 and holds a pressure block 41 which, upon arm 38 being tightly clamped in the downward position, as by means of a clamp arrangement 42, 43, is adapted to exert the proper pressure upon the abutted ends of the film portions 36, 37 during the splicing process, as described in more detail below.

The working surface 22 is also provided with a control switch 44, an interlock switch 46, a trimmer 45, a sprocket hole punch 47, and a cutter 48 formed by a shearing knife 49 carried on arm 38 and cooperating with a shearing block 50 on base 21.

In motion picture film, as is well known, the photographic emulsion defines a series of equal-sized "frames," each frame being an independent photograph. The film is loped with a series of equally spaced sprocket holes on one or both sides. In splicing such film, it is essential that the proper relationship be retained between frames and between sprocket holes. This is done in the present instance by having both ends of the film to be spliced cut along the frame lines separating adjoining frames. This is assured by the provision of locating pins 55 on shearing block 50, which serve to position the film during the cutting operation so that it is always cut at the frame line, which in the case of the customary comercial type of motion picture film, such as of the 8-millimeter or 16-millimeter type, coincides with a sprocket hole. However, if desired, it is to be understood that the cutter can be arranged to sever the film centrally of the frame or at any other desired point. It has been found, however, that least interference with the pictures recorded on the film is obtained by having the splices formed at the frame lines, as in the present illustrative embodiment of the invention.

After both film sections are properly cut on the cutter 48, the two ends are then placed on the locating pins 29 of the heater assembly 23, being held in the proper end-abutting position by the film holding arms 31, 32, with the junction line positioned centrally of heater assembly 23. Thereafter the pressure arm 38 is placed in the lowered position, parallel to the working surface 22, where it is held by the clamp 42, 43. In so doing, a projection or boss 51, preferably formed integrally of pressure arm 38, depresses the actuating button 52 of the interlock switch 46, whose function is described hereinbelow. At the same time, pressure block 41 applies the predetermined correct pressure to the film ends 36, 37.

As shown more clearly in Figs. 3 and 7, the pressure block 41 is formed of a block 64 or low-heat-conductivity material, to which is fastened a thin sheet-metal retainer 65, bent outwardly to form a pair of ears 66 adapted to hold one or more thin sheets of a material suitable for application directly to the film. As discussed below, such material may be mica, stainless steel, "nichrome," heat-resistant Bakelite or other low- or moderate-heat-conductivity material of a thickness proportioned to yield the empirically determined proper temperature gradient. The pressure block 41 is clamped in a holder 56 by screws 60, which holder 56 is urged away from the pressure arm 38 by a pair of coil compression springs 53, being retained, however, by screws 54 threaded into the pressure block holder 56 and passing freely through the pressure arm 38. As arm 38 is clamped down, the springs 53 are compressed, during which the heads of screws 54 lift away slightly from the arm 38. In this way the springs 53 cause the pressure block 41 to exert a predetermined constant pressure against the ends of the films to be spliced. By the use of two springs 53, the pressure block 41 becomes self-aligning, and exerts a uniform pressure across the entire width of the films to be joined.

After the pressure arm 38 is thus clamped in place to apply the pressure of the pressure block 41 against the film, the actuating button 58 of the control switch 44 is depressed. As will be described below, this causes electric current to flow through the heater element 24 for a preset time interval, adjusted to produce the desired character of weld or splice. It will be understood that too long a time interval causes the film to soften to far and produces bubbles in the resulting splice and discoloration of the film emulsion (if any). Too short a time interval does not permit the film to soften sufficiently to cause a good bond. In either event, the splice is relatively weak and poor. However, for the proper intermediate adjustment, which under ordinary circumstances ranges from 8 to 15 seconds, a highly efficient welded splice is formed.

The present apparatus is so designed that at the end of the proper period the heater current is automatically turned off, after which the splice is left to cool for a short time interval, such as of the order of 10 to 15 seconds. Thereafter, the pressure arm 38 is released and raised, and the spliced film is removed by lifting the resilient holding arms 31 and 32.

Since during the welding operation the film is softened and is under considerable pressure, there is a marked tendency for the material of the film to flow, producing "side-flash," as shown in the sketch of Fig. 11, which illustrates the character of the splice immediately after the welding operation. This side-flash is trimmed by use of the trimmer 45. Also, the material of the film tends to flow over the sprocket hole, usually located at the frame line and hence at the splice line itself. This sprocket hole is then repunched by use of the punch 47, which is described herebelow.

An important aspect of the invention is the construction of the heater assembly, one embodiment of which is shown in exploded view in Fig. 6. As is shown here, this unit has an insulating block or base member 106 with a very shallow groove 107 formed therein between two openings 108 and adapted barely to accommodate the very thin resistance wire strip forming the heater element 24, which is held in place by a pair of studs 111 passing through openings 108 and having enlarged heads 112 which hold the ends of the wire 24 between heads 112 and block 106 when clamped in place by nuts 113. Studs 112 thereby provide both a mechanical connection and an electrical connection to the ends of the wire 24.

The insulating block 106 is also provided with a transverse groove 115 and a series of small openings 116 communicating therewith, in which is slipped a comb-like member 109 having prongs or teeth 110 fitting into the openings 116 and projecting above the block 106 and the other elements to be presently described, to provide the locating pins 29 mentioned above.

Overlying the resistance wire heater element 24 and resting on the block 106 are one or more thin temperature-gradient-producing sheets 121, 122, 123, and 124, each having openings shown at 126 aligned with apertures 116 and permitting the comb teeth 110 to project therethrough. Sheets 121 to 124 also have recesses 127 whereby these sheets clear the studs 111, to avoid any electrical interaction therewith. These sheets 121 to 124 provide the proper temperature gradients having maximum temperature directly above the heater element 24 and gradually decreasing on either side thereof.

It has been found that an essential factor in the formation of an efficient weld for material of this type lies in the production of the proper temperature gradient along the film material on either side of the splice line. If heat is applied only locally, to a very narrow area adjacent the splice line, the finished splice is found to have very poor resistance to flexing. However, by providing a gradual temperature gradient, avoiding sharp temperature changes, this defect is eliminated, and an efficient splice results which can comply with all the standard tests with regard to flexure. The proper material and its thickness required for the desired gradient is determined empirically, but it has been found that, in general, a material having relatively poor heat conductivity combined with ability to resist high temperatures and with a smooth surface, is required. In addition, the material must be able to withstand the pressures used during splicing. It has been found that the thickness of the gradient-producing sheets in relation to their heat conductivity determines the gradient obtained. In general, the better the heat conductivity, the thinner must be the overall thickness of the set of sheets 121 to 124. A plurality of sheets are needed only to build up the required overall thickness from stock sheet sizes. Where the proper thickness can be procured commercially, only a single sheet is necessary, varying from one-thousandth of an inch to 10–12 thousandths of an inch thick.

Mica has been found to be suitable here and has a smooth surface adapted to produce a smooth completed splice. However, mica suffers from the disadvantage that it tends to chip and crack under pressure, especially when subjected alternately to heavy and light pressures as in the present device. Since any material having similar resistance to deterioration under exposure to heat, similar smoothness of surface, and similar heat conductivity may be substituted, many other materials may be used, such as metallic sheets, especially of materials having relatively high electrical resistance, which generally accompanies poor heat conductivity. Such metals are heat-resistant so as not to deteriorate, and also have a good surface smoothness. Highly desirable materials are stainless steel, nichrome, and nickel, for which practicable thicknesses will yield proper temperature gradients. Also their highly polished surfaces produce smooth splices and inhibit sticking of the film or emulsion during splicing. Of course, any other metallic or non-metallic substances having the qualities discussed above are also useful, and can readily be designed for use in the present device. Some such other materials are aluminum, cold-rolled steel, heat-resistant Bakelite, "Alsimag," "Mycalex," or glass.

Where the temperature gradient sheet or sheets are formed of metallic material, it may be desirable to provide an insulating high-temperature coating upon the heating element 24, or an insulation covering for it. Of course, where mica is used for the bottom sheet, the insulating properties of the mica itself are used for this function.

In assembly, heater element 24 is fixed to the insulating block 106 by the studs 111 as described above. Then the comb 109 is passed through the apertures 116 of block 106, and the resulting unit is placed in the recess 127 of the working surface 22 of base 21 as shown in Fig. 3, with the threaded portions of studs 111 passing freely and insulatedly through cooperating openings in the recess 127 of base 21. One or more of the temperature gradient strips 121 to 124, according to how many are used, are then placed upon the top of block 106, and a cover frame 128, having upstanding ears 129 for pivotally supporting the film-holding arms 31, 32, is placed on top of the unit, which is then held fixedly in position by suitable screws passing through openings 131 in the cover frame 128 and tapped into the top of base 21. In this way, upon passage of electric current through heater element 24 in the manner to be described, heat is impressed from element 24 through sheets 121 to 124 upon the film sections to be welded, with the necessary gradual temperature gradient on either side of the splice line.

As an alternative construction, the entire heater assembly 23 may be molded or cast as a single unit of an insulating material having the characteristics discussed above, namely, high-temperature resistance, low heat conductivity, and a smooth upper surface. The heater element 24 would then be integrally molded within the assembly at a distance below the upper surface thereof suitable for obtaining the desired temperature gradient. Comb 109 could then also be molded into the integral unit, or, alternatively, merely its teeth 110 need be molded in to form the locating pins 29.

If desired, a narrow stainless steel or nichrome strip, say 3/32 inch wide, may be molded into the upper surface of a block of insulating material having the characteristics just mentioned. Such a strip may be used then as the heater element 24, and the block itself acts to produce the required temperature gradient.

The quality of the completed splice is also determined by the character of the pressure block 41. The structure described above merely illustrates one form which this pressure block 41 may assume. A simpler form of pressure block is shown in Fig. 13, wherein the pressure block is shown as a single rectangular parallelopiped 171 of a low heat conductivity, high-temperature resistant material formed with a highly polished lower face 172 adapted for engagement with the upper side of the film sections to be spliced. Suitable materials for this pressure block 171 include glass, "Alsimag," "Mycalex," or heat-resistant Bakelite. In this instance, the retainer 65 and the sheets held thereby are eliminated, the polished lower surface of block 171 serving the same purpose. Block 171 is retained in the block holder 56 in the same manner as block 41.

A modified form of such pressure block is shown at 173 in Fig. 14, having a rounded lower polished face 174, having a large radius of curvature, of the order of 8 inches, whereby a pressure gradient is established having a maximum pressure at the junction line and diminishing gradually on either side thereof.

It will be understood that the pressure block, such as 41, 171, or 173, assists in providing the desired character of splice since it helps to determine the distribution of temperature consequent upon heat absorption along the film sections to be welded. For modifying this temperature distribution in a desired manner, the pressure blocks 171 or 173 of Fig. 13 or 14 may be provided with metallic inserts extending parallel to the heater element 24 when the pressure arm is lowered and clamped. One desirable arrangement is shown in Fig. 15, where the pressure block 176, generally of the same type as block 171 of Fig. 13, is provided with a metal insert 177. Insert 177 is preferably formed of one of the substances discussed above, such as stainless steel, nickel, or nichrome sheet material, of a width approximately 2 to 4 times the width of the heater element 24. As shown in Fig. 16, two such metal inserts 178, 179 may be desirably employed in some instances, on either side of a projecting strip 181 of the material of block 176. It will be understood that in Fig. 15 or 16, the lower surface of block 176 may be curved as in Fig. 14, the inserts 177, 178 and 179 being flush with this lower surface. Also, in Figs. 15 and 16, pressure block 176 may be of metallic material such as brass or the like, and the inserts 177, 178 and 179 may then be of insulating material, such as heat-resistant Bakelite.

According to the present invention, an automatic control is provided for the welding interval (which is the interval during which current is passed through the heater element 24). The arrangement producing this automatic timing of the welding interval is shown most clearly in Figs. 2, 3 and 4 and schematically in Fig. 5. As shown in Fig. 3, the interlock switch 46 comprises an actuating button 52 connected to a push-rod 73 insulatedly carrying a conductive cross-bar 74. An insulating piece 75 carries one or more pairs of strip-spring contacts 76 which are insulated from one another unless connected by the cross-bar 74. Contacts 76 are connected respectively to the switch terminals. Thus, upon depressing button 52, push-rod 73 moves cross-bar 74 downward to interconnect the contacts 76 and close the switch. However, a spring 77 normally maintains cross-bar 74 away from contacts 76 to maintain the interlock switch 46 in the open position.

Figure 4:
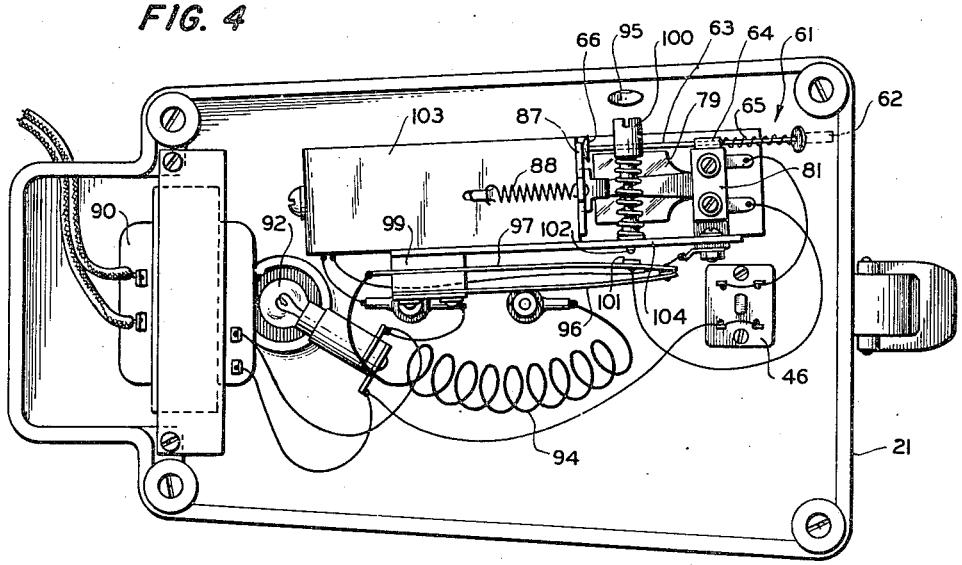
Fig. 4 is a bottom view of the apparatus of Figs. 1 to 3, with the bottom plate removed.

As shown most clearly in Fig. 2, the control switch 44 is formed of an insulating push-rod 57 whose upper end provides an actuating button 58. Rod 57 is normally held up by a leaf-spring 79 supported by an insulating block 81 from the underside of the base 21. Also supported by block 81 are a pair of resilient contactor arms 82 carrying contact buttons 83. The uppermost contactor arm 82 carries on its upper surface a thin sheet of insulation 84, so that electrical contact between spring 79 and the contactor member 82 is prevented. Normally the resilience of leaf-spring 79 keeps the push-rod 57 up and away from the contacts 83, which then remain open. However, upon depressing the button 58 and push-rod 57, leaf-spring 79 is bent in cantilever fashion, and causes contacts 83 to close. The left end of the leaf-spring 79 (as viewed in Fig. 2) slips into an opening 86 of a relay armature 87, which has the configuration shown more in detail in Fig. 8. The armature 87 is pivoted near its lower end upon a relay casing 103, and the action of a small coil spring 88 connected to this lower end causes the upper end of the armature 87 to be urged to the right (as viewed in Fig. 2) so that, when leaf-spring 79 is depressed, the armature 87 slips around the end of leaf-spring 79 to hold it in the downwardly bent position, whereby contacts 83 are maintained closed. As will be described more in detail below, contacts 83 then remain closed until automatically released after a predetermined time interval by the action of relay 85. However, a manual release 61 is also provided, as seen in Figs. 1 and 4. Release 61 comprises a button 62 fixed to a rod 63 supported in a bracket 64 held on insulating block 81. A spring 65 normally urges rod 63 to the right (as seen in Fig. 4) so that its head 66 is disengaged from relay armature 87, thereby permitting free action of armature 87. However, by pushing upon button 62, the rod head 66 engages armature 87 and pivots it about its lower end, so that leaf-spring 79 is released to spring back up and permit contacts 83 to separate, whereby switch 44 is opened. In this way, should switch 44 accidentally be closed, or should interruption of the circuit be desired, release 61 permits manual opening of switch 44.

As is shown schematically in Fig. 5, electrical power from any suitable source, such as the conventional power line, is applied to the primary of a step-down or current transformer 90 across whose secondary 91 is connected the indicator and editing light 92. Connected in series across this transformer secondary 91 are the interlock switch 46, the contacts 83 of the control switch 44, a bimetallic unit indicated at 93, a current-limiting coil 94, and the heater element 24. The bimetallic unit 93 is formed of two separate bimetallic elements 96 and 97 which are arranged so that they tend to bend oppositely in response to a given temperature change. At one end the bimetallic elements 96 and 97 are joined by a loose rivet 98, while at the other end they are mechanically connected by an insulating block 99, mounted on the relay case 103. One terminal of the transformer secondary 91 is connected by way of switches 46 and 44 to a contact button 101 fixed to the bimetallic element 97 near one end thereof, while the other end of the bimetallic element 97 is connected to the other end of the transformer secondary through coil 94 and heater 24. It will thus be seen that the current flowing through the resistance element 24 also flows through a major portion of the bimetallic element 97, which thereby becomes heated by virtue of its ohmic losses. The rise in temperature of the bimetallic element 97 causes it to bend to the left until the contact 101 touches a cooperating contact 102, adjustably mounted in a bracket 104 insulatingly supported on the underside of the base 21. Access hole 95 permits adjustment of contact 102 by turning screw 100 on which it is mounted.

Contact 102 is connected to one end of the relay coil 85, whose other end is connected directly to the opposite terminal of the transformer secondary 91. Thus, as soon as contacts 101 and 102 touch, the transformer secondary 91 is connected through switches 46 and 44 across the relay coil 85. Excitation of this coil 85 produces a magnetic field which attracts the armature 87 away from the leaf-spring 79, which is thereby disengaged to spring back to its free position, opening contacts 83 to interrupt the flow of current through the heater element 24.

The use of the pair of bimetallic elements 96 and 97 to form the bimetallic unit 93 assures that variations in ambient temperature will have little or no effect upon the operation of the device. It will be appreciated that, if but a single bimetallic element, such as 97, were utilized alone, it would change its curvature for every change in ambient temperature, and would thus change the interval between closing of switch 44 and excitation of relay 85. However, since the bimetallic elements 96 and 97 tend to bend oppositely in response to a given change in temperature, their forces cancel one another so that the position of contact 101 remains substantially unaltered for ordinary ambient temperature changes. This apparatus is thus self-compensating for changes in ambient temperature. It is also self-compensating for changes in line voltage. It will be appreciated that, for a higher-than-normal line voltage, more current will flow through resistance element 24, thereby requiring a shorter time of weld. Since this higher current also flows through the bimetallic element 97, it will cause the element 97 to bend more quickly, thereby reducing the welding time interval, as is desired. Conversely, for a lower line voltage, the welding time is increased, as is also necessary. Accordingly, the apparatus is adapted to provide the proper welding time for a substantial range of voltage variations, such as from 100 to 130 volts, much wider than are normally encountered.

In operation, the film ends are first cut on the cutter 48 and are then placed upon the heater assembly 23 with the splice line immediately over the heater element 24. Pressure arm 38 is then lowered and clamped into place by clamps 42, 43, thereby depressing interlock switch 46. Operating switch 44 is then actuated by depressing its button 58. The control circuit just described then passes heating current through element 24 for the proper time interval. (This interval may be varied by adjusting contact 102 in bracket 104.) As soon as the pre-set interval has elapsed, relay 85 is energized and cuts off the current by opening switch 44. The splice is now completed.

As shown in Fig. 11, the pressure applied to the film during splicing produces side-flow of the film material, resulting in "side-flash" 105. In order to trim this side-flash, a simple, inexpensive and yet efficient trimmer 47 is provided, which is shown more in detail in Fig. 10. It comprises a shearing block 141 on a base plate 143, cooperating with a steel shear-knife 142 in the form of a leaf-spring, also mounted upon a base plate 143, as by rivets 144 at one end. In its normal position, spring 142 makes an acute angle with the base plate 143 and is so located that it makes rubbing contact with one edge of block 141 when depressed by pressure applied to an actuating member or knob 146, fixed to the spring 142. An upstanding guide lug 147 is located at one end of the shearing edge of block 141.

In operation, the film to be trimmed is held against lug 147 and spring 141, with the flash underneath spring 142. Then, upon depressing the member 146, the flash is neatly sheared off to form the edge of the splice into the desired straight continuation of the remainder of the film. After the first trimming operation, the film is merely turned over and the operation repeated for trimming the side flash on the other edge of the film.

As mentioned above, the splicing operation also tends to fill in the sprocket hole when located along the splice line. For repunching the sprocket hole, use is made of a simple punch illustrated in Fig. 9 and comprising a base plate 151 having locating pins 152 thereon. Equidistant between these locating pins 152 there is a die opening (not shown) having the same configuration as the desired sprocket hole. A punch member 153 having an end mating with the die opening in base plate 151 is mounted upon a bracket 154 and has a guide plate 155 for guiding its end into the sprocket hole die upon depressing the knob 156. A spring 157 keeps the punch 153 in its "up" position in preparation for a succeeding punch.

In operation, the film to be punched is placed with its sprocket holes upon pins 152, and the knob 156 is depressed. After this simple operation, the desired sprocket hole is reformed at the location of the splice line, as desired.

The apparatus just described can also serve to repair worn or torn sprocket holes in motion picture film. The film is merely placed (without any cutting at all) on the locating pins 29 with the sprocket hole to be repaired located over the heater element 24 and in alignment with the studs 111. The pressure arm 38 is clamped down, and the same procedure as for splicing is used. The heating of the film then refills the sprocket hole which is then punched out as described. Where the film is torn materially, a piece of film base material may be placed over the sprocket hole before clamping the pressure arm 38. This extra material will then serve to replace any missing portion of the film to strengthen the reformed sprocket hole.

The apparatus of the present invention is adapted for use with film of varying widths. However, where narrower film is used, such that only a small portion of the heater element 24 is covered by the film, it is found that the center of pressure produced by the pressure block 41 may be at one edge of the film, so as to produce non-uniform welds across the width of the film. To prevent this, the uppermost gradient sheet 124, instead of being of uniform thickness as shown in Fig. 6, may be as shown in Fig. 12, having a portion 132 of the required thickness for proper temperature gradient, upon which portion the film to be welded rests, and having another portion 133 of greater thickness, the step between portions 132 and 133 being slightly less (that is, a few thousandths of an inch less) than the thickness of the film. The pressure produced by the pressure block is thus equalized, and a more uniform splice results. In this way, for example, merely by the substitution of the sheet of Fig. 12 for sheet 124 of Fig. 6, a splicer formerly adapted for 16-millimeter film can be converted for completely successful use with 8-millimeter film.

When using the present invention with film bearing a photographic emulsion, such as motion picture film or microfilm, an important consideration is the flow or distortion which may be produced in the emulsion. It is found that such emulsion flow is relatively insignificant in a direction along the film, but may be material along the transverse direction, especially in the vicinity of the splice line. Where such emulsion distortion is a troublesome factor, it may be substantially eliminated according to further features of the present invention, in any of several different ways.

For example, it has been found that, when using metallic gradient-producing sheets, the surfaces overlying and/or underlying the film to be spliced may be roughened slightly, as by use of sandpaper, to produce minute scorings or scratches. Preferably these are formed in directions somewhat along the length of the film, and at an angle to the splice line. Such unevennesses seem to "key in" the emulsion, and to prevent its side flow. However, by making the roughness very slight, little effect is had upon the effectiveness of the completed splice.

According to another method, the pressure block is formed as shown at 166 in Fig. 17. This block 166 is made of material similar to blocks 171, 173 or 176, and is molded or machined to have a slightly rounded lower surface 167 adapted to be impressed on the film splice when pressure arm 38 is clamped down, similar to that shown in Fig. 14. To prevent side flow of emulsion, block 166 is provided with a series of shallow grooves 167, only 0.0005 to 0.001 inch in depth, and extending transverse to pressure arm 38. If desired these grooves may extend at other angles to arm 38, but not parallel thereto, and need not be parallel to one another. For example, successive grooves may be oppositely slanted at acute angles to arm 38. A thin mica or metal plate of the character used in the heater assembly 23 may optionally be placed over the grooved face of pressure block 166 (being retained as shown in Fig. 7).

During the welding process, these grooves form slight ribs in the splice, and prevent sideflow of emulsion. These ribs also tend to prevent the formation of the side-flash at the edges of the film by restricting the side flow to the material of the film in the immediate vicinity of the edge of the film. Thus, they have a tendency to strengthen the splice in the neighborhood of the splice line by tending to retain the material of the film at the splice line, instead of letting it flow out.

Still another way of preventing distortion of the film emulsion is illustrated with respect to Figs. 18 and 19, which show masking strips 134 and 135 of different size but otherwise the same character. Referring, for example, to mask 134 of Fig. 18, it will be understood that this masking strip is adapted to be inserted between the uppermost gradient-producing sheet 124 and to the frame 128. The masking strip 134 has a thickness substantially equal to but slightly less than the thickness of the film to be welded, that is, of the order of one-half to two one-thousandths of an inch less than the film thickness. It has a width substantially exactly equal to the width of the film to be spliced. In use, the masking strip 134 is placed so that, when the film sections are in place to be welded, their side edges abut against the inner edges 136 of the masking strip 134. Then, during the welding process, the film, although softened to permit proper bonding, cannot flow sideways because of the abutting edges 136 of the masking strip 134. Accordingly, the side flash 105 illustrated in Fig. 11 is substantially completely eliminated. Since this side flow is prevented, the consequent distortion of the emulsion is also substantially reduced. The masking strip 135 of Fig. 19 is substantially the same as that of Fig. 18, except adapted for use with narrow width film. It will be understood that, dependent upon the width of the film to be spliced, either masking strip 134 or 135 will be inserted between the gradient sheet 124 and the frame 128. Where the sheet shown in Fig. 12 is used, it may be combined with masking strip 135 of Fig. 19 to form a single integral unit, which is then substituted for sheet 124 of Fig. 6.

When using masking strips such as shown in Fig. 18 or 19, locating pins 29 need be used only on one side of the splice line, the masking strip serving to align the film sections properly. In this case, one film section is placed on the locating pins 29, the other film section being laid in the masking strip opening with its end abutting the first film section end. Arms 31 and 32 then hold the film sections in place during splicing, as before.

When using the molded form of heater assembly discussed above, a masking strip, such as in Fig. 18 or 19, may be integrally incorporated therewith or may be separately fastened thereto, as where it is desired to use the apparatus alternatively with films of different width.

The use of these masking strips also serves to strengthen the finished welded splices, since substantially all of the film material is retained in the splice itself, rather than being wasted by formation of the side-flash which is later trimmed off. By the use of such a masking strip, it may become unnecessary to provide the trimmer 45 shown in Fig. 11, which accordingly can then be omitted.

The above method and apparatus of splicing film has been found to be highly satisfactory even with widely different types of film of the thermoplastic type. However, with some films which have been greatly aged, the thermoplastic material apparently loses its plasticizer component, so that insufficient flow takes place during the welding process, resulting in an imperfect bond. This can be avoided by the simple expedient of placing a narrow strip of material similar to that of the film itself, but with a higher proportion of plasticizer component, immediately over the splice line before clamping the pressure arm 38 in position. Then, during the welding operation, this strip of material becomes bonded to both sections of film to be spliced, and supplies sufficient plasticizer to produce a highly effective welded splice. The resultant thickness of such a welded splice is, however, no greater than that of the original film, since the added strip merges completely with the original film material.

With certain types of film, it is found that an improved bond is obtained when applying heat simultaneously from both sides of the film during the splicing operation. This can be accomplished by the use of the pressure block shown in Fig. 20. In this apparatus, the pressure block 181, of a material similar to heater assembly block 106, is made of a length to fit between the studs 111 of Fig. 1 or 6, and is provided with a heater element 182 set in substantially flush with the lower surface of block 181. Element 182 is held in place by a pair of screws 183 tapped into recesses in the ends of block 181. Screws 183 also hold a pair of Phosphor bronze spring contacts 184 in electrical connection with the ends of heater element 182. These contacts 184 are adapted to electrically connect to respective studs 111 when pressure arm 38, carrying the pressure block 181 in the manner shown in Fig. 3, is lowered and clamped. Thus, heater element 182 is then connected in parallel with heater element 24, and is excited simultaneously therewith. One or more temperature-gradient-producing sheets 186 are supported on block 181 in the manner shown in Figs. 1 and 7 to provide the necessary gradients for the upper film surfaces, in the manner discussed above. The heated pressure block is thus constructed in similar fashion to the heater assembly 23. In this way, welding heat is supplied from both above and below the film, and an improved weld results.

Accordingly, there has been described above a highly useful and novel apparatus for producing electrically welded film splices, characterized by a thickness no greater than that of the original film to be spliced and avoiding the necessity of using any scraping or cementing operation or the use of any cement or adhesive. A welded film splice is thereby produced which has substantially all the characteristics of the original unspliced film, and distortion of the film emulsion is almost completely avoided. The apparatus produces completely consistent and uniform splices no matter what the skill or experience of the operator may be.

Since many changes could be made in the above construction and many apparently widely different embodiments of this invention could be made without departing from the scope thereof, it is intended that all matter contained in the above description, or shown in the accompanying drawings, shall be interpreted as illustrative and not in a limiting sense.

What is claimed is:

1. Apparatus for splicing thermoplastic film sections, comprising an insulating block having a groove therein; a resistance heater element mounted on said block in said groove and substantially flush with the upper surface of said block; a temperature-gradient-producing sheet covering said block and heater element and having a restricted heat conductivity, whereby the temperature of the upper surface of said gradient plate is a maximum directly over said heater element and gradually decreases on either side thereof; a masking plate covering a portion of said gradient plate and having an elongated opening therein of a width equal to the width of film section to be spliced, within which opening said film sections are adapted to be placed in abutting end-to-end relation with their junction line overlying said heater element; means for applying pressure to said film sections at said junction line, with maximum pressure at said junction and gradually decreasing pressure on either side thereof; and means for passing electric current through said heater element for a predetermined interval of time, whereby said film section ends are softened and bonded together, while said masking member prevents side-flow of the material of said film sections.

2. Apparatus for splicing thermoplastic film sections, comprising a heater assembly having an elongated heater element extending along the splice line of said film sections, a masking member overlying said heater assembly and having edges at least as thick as and adapted to abut both the side edges of said film sections when in position for splicing, and a pressure member adapted to apply pressure to said film sections during the splicing operation.

3. In apparatus for splicing thermoplastic film by the application of heat and pressure to the abutting ends of the film sections to be spliced, the improvement comprising a masking member adapted to abut both the side edges of said film section during said heat and pressure application to prevent side-flow of the material of said film sections.

4. Apparatus for splicing thermoplastic film sections, comprising a heater assembly having an insulating block carrying an elongated electrical heater element, a temperature-gradient-producing sheet covering said block and heater element, means for holding said film sections under pressure against said sheet in abutting end-to-end relation with their junction line overlying said heater element, means for passing current through said heater element to soften and bond the abutting ends of said film sections, and means on both sides of said film for preventing side-flow of said film.

5. Apparatus for splicing thermoplastic film sections, comprising a heater assembly having an insulating block carrying an elongated electrical heater element, a temperature-gradient-producing sheet covering said block and heater element, means for holding said film sections under pressure against said sheet in abutting end-to-end relation with their junction line overlying said heater element, means for passing current through said heater element to soften and bond the abutting ends of said film sections, and means for preventing side-flow of said film comprising a masking member adapted to abut the side edges of said film sections during the application of heat thereto.

6. Apparatus for splicing thermoplastic film sections, comprising a heater assembly having an insulating block carrying an elongated electrical heater element, a temperature-gradient-producing sheet covering said block and heater element, means for holding said film sections under pressure against said sheet in abutting end-to-end relation with their junction line overlying said heater element, means for passing current through said heater element to soften and bond the abutting ends of said film section, means for preventing side-flow of said film, and a pressure block adapted to be pressed upon the upper surfaces of said film sections at said junction line during the application of heat thereto, said block having grooves running at an angle to said junction line and heater element.

7. Apparatus as in claim 6, wherein the surface of said pressure block adapted to overlie said film sections is arcuately, convexly curved about an axis parallel to said heater element, whereby maximum pressure is applied to said film sections directly at said junction line, with decreasing pressure on either side thereof.

8. Apparatus for splicing thermoplastic film sections, comprising a heater assembly having an insulating block carrying an elongated electrical heater element, a temperature-gradient-producing sheet covering said block and heater element, means for holding said film sections under pressure against said sheet in abutting end-to-end relation with their junction line overlying said heater element, means for passing current through said heater element to soften and bond the abutting ends of said film sections, means for preventing side-flow of said film, and a pressure block having a surface of low heat conductivity adapted to overlie said film ends, said surface also being scored at an angle to said heater element.

9. Apparatus for splicing thermoplastic film sections comprising a heater assembly having an insulating block carrying an elongated electrical heater element, a temperature-gradient-producing sheet covering said block and heater element, means for holding said film sections under pressure against said sheet in abutting end-to-end relation with their junction line overlying said heater element, means for passing current through said heater element to soften and bond the abutting ends of said film sections, said film-section-holding means including a pressure block having a surface of low heat conductivity adapted to overlie said film ends, said surface being scored at an angle to said heater element.

10. Apparatus for splicing thermoplastic film sections, comprising a heater assembly having an elongated electrical heater element extending at least as long as the splice to be made, and a pressure arm pivotally connected to said assembly and carrying a pressure block adapted to overlie said heater element with the film to be spliced therebetween, said pressure block having shallow channels running angularly of said heater element.

11. Apparatus for splicing thermoplastic film sections comprising a heater assembly having a heater element and a pressure block adapted to overlie said heater element with the film sections to be spliced therebetween, said pressure block having shallow channels running angularly to said heater element.

12. Apparatus for splicing thermoplastic film sections, comprising a heater assembly having an elongated electrical heater element and adapted to hold said film sections in abutting relation with their junction line overlying said heater element, means for holding said film sections under pressure while exciting said heater element to provide heat for softening and bonding said film sections, and means extending along both sides of said film sections and having a thickness less than that of said film for preventing the material of said film sections from flowing in a direction along said heater element, whereby a stronger welded splice is produced.

13. The method of joining sections of film having a thermoplastic base and a coating thereon, comprising the steps of arranging said sections to be joined in abutting edge-to-edge relation along a junction line, applying pressure to said sections at and adjacent to said junction line, applying heat at said junction line, and preventing side-flow of the material of said film in both directions along said junction line but not transversely thereof, whereby said film-sections are bonded together while said coating is kept substantially undistorted.

14. The method of joining sections of thermoplastic film, comprising the steps of placing said film sections in abutting end-to-end relation, applying pressure to said sections at their junction line, applying heat at said junction line, and preventing side-flow of the material of said film sections in both directions along said junction line.

15. Apparatus for splicing thermoplastic film sections comprising a base member having a pair of projecting conductive elements, a heater element extending along said base member between said conductive elements and connected thereto, and a movable pressure block adapted to be held against said base member with predetermined pressure, said pressure block having a second heater element extending therealong, and also having a pair of contacts connected to the ends of said second heater element and adapted to contact said conductive elements when said pressure block is held against said base member.

16. Apparatus for splicing thermoplastic film sections by the application of heat and pressure thereto, comprising a base member adapted to hold said film sections in end-abutting relation, means for applying heat to said sections along their junction line, and a pressure block adapted to be held under pressure against said film sections at said junction line, said pressure block having an arcuately curved surface adapted to overlie said film sections at said junction line and having an axis of curvature parallel to said junction line.

17. Apparatus for splicing thermoplastic film sections comprising a heater element, a temperature-gradient-producing metal sheet overlying said heater element and providing a surface adapted to support the film sections to be spliced, said sheet having a side-flow-preventing portion of thickness greater than that of said film supporting portion by an amount substantially equal to the thickness of said film sections, and means for applying pressure to said film sections, comprising a pressure block adapted to overlie both said sections and said greater-thickness portion of said sheet.

18. Apparatus for electrically splicing thermoplastic film sections comprising means for holding said sections with their ends in abutting relation along a junction line, and a pressure block adapted to apply pressure to said film section ends, said block being formed of an insulating material and having inserted therein a narrow strip of metallic material adapted to overlie said junction line.

19. Apparatus for electrically splicing thermoplastic film sections comprising means for holding said section with their ends in abutting relation along a junction line, and a pressure block adapted to apply pressure to said film section ends, said block being formed of a metallic material and having inserted therein a narrow strip of insulating material adapted to overlie said junction line.

BEN EISENBERG.

REFERENCES CITED

The following references are of record in the file of this patent:

UNITED STATES PATENTS

| Number | Name | Date |
|---|---|---|
| 1,026,456 | Rambaud | May 14, 1912 |
| 1,209,339 | Schippers et al. | Dec. 19, 1916 |
| 1,432,466 | Kalmbach | Oct. 17, 1922 |
| 1,758,619 | Phillips | May 13, 1930 |
| 1,771,394 | Antonuk | July 29, 1930 |
| 1,981,332 | Rohrdanz | Nov. 20, 1934 |
| 2,250,194 | Gavin | July 22, 1941 |
| 2,289,618 | Young | July 14, 1942 |
| 2,294,950 | Babcock | Sept. 8, 1942 |
| 2,301,664 | Eggert et al. | Nov. 10, 1942 |
| 2,327,861 | Bolsey | Aug. 24, 1943 |
| 2,372,737 | Phillips | Apr. 3, 1945 |
| 2,439,017 | Meyers | Apr. 6, 1948 |
| 2,468,629 | Herzig et al. | Apr. 26, 1949 |
| 2,480,794 | Waggoner | Aug. 30, 1949 |